United States Patent
Cadbury

Patent Number: 5,615,759
Date of Patent: Apr. 1, 1997

[54] CASH HANDLING APPARATUS

[76] Inventor: Matthew J. Cadbury, 13 Sloane Gardens, London SW1W 8EB, England

[21] Appl. No.: 360,748
[22] PCT Filed: Apr. 26, 1994
[86] PCT No.: PCT/GB94/00889
§ 371 Date: Dec. 23, 1994
§ 102(e) Date: Dec. 23, 1994
[87] PCT Pub. No.: WO94/25940
PCT Pub. Date: Nov. 10, 1994

[30] Foreign Application Priority Data

Apr. 27, 1993 [GB] United Kingdom ............... 93080687

[51] Int. Cl.⁶ .................. G07D 11/00; G07G 1/12
[52] U.S. Cl. .................... 194/206; 235/7 A; 235/383; 395/223
[58] Field of Search ..................... 194/206, 207, 194/216, 217; 453/1, 2; 235/7 A, 383; 221/7; 364/405

[56] References Cited

U.S. PATENT DOCUMENTS

| | | | |
|---|---|---|---|
| 3,608,690 | 9/1971 | Morrow et al. | 194/206 |
| 3,654,433 | 4/1972 | Mendoza | 235/7 A |
| 3,828,166 | 8/1974 | Johansson et al. | |
| 4,070,564 | 1/1978 | Tucker | 453/2 X |
| 4,253,016 | 2/1981 | Hirose | 194/207 X |
| 4,310,885 | 1/1982 | Azuca et al. | |
| 4,538,057 | 8/1985 | Iwagami et al. | |
| 5,183,142 | 2/1993 | Latchinian et al. | 194/206 |
| 5,251,738 | 10/1993 | Dabrowski | 194/206 |

FOREIGN PATENT DOCUMENTS

| | | | |
|---|---|---|---|
| 0555531A1 | 11/1992 | European Pat. Off. | |
| 2400442 | 7/1975 | Germany | 453/2 |
| 4086994 | 3/1992 | Japan | |

*Primary Examiner*—Karen B. Merritt
*Assistant Examiner*—Scott L. Lowe
*Attorney, Agent, or Firm*—Klauber & Jackson

[57] ABSTRACT

Cash handling apparatus including an insertion mechanism for the insertion of cash into the apparatus by a customer for an article or articles, a container for holding the cash inserted into the apparatus, a detection mechanism for detecting the amount of cash inserted, a price infeed mechanism to notify to the apparatus a price of the article or articles, a calculation device for comparing the difference between the cash fed into the apparatus and the price of the article or articles, and a dispensing mechanism for dispensing cash equal to the difference in the price to be paid and the amount of cash inserted as detected by the detection mechanism. The insertion mechanism and container are arranged so that once the cash has been inserted into the container it is not thereafter readily accessible, and the cash insertion mechanism and cash dispensing mechanism and price infeed mechanism are provided such that the customer inserts the cash as payment and dispensed cash representing the change due is delivered directly to the customer. An electrical datalink connects the apparatus to a central monitoring, alarm and checking system.

11 Claims, 1 Drawing Sheet

CASH HANDLING APPARATUS

BACKGROUND OF THE INVENTION

1. Field of the Invention

This invention relates to cash handling apparatus, and more particularly relates to the apparatus known as a till or cash register, which is used by retail outlets of all kinds.

2. Description of the Related Art

Currently, when a till or cash register is in use there are the continuing risks that on the one hand the person operating the till or register may be tempted to steal cash therefrom, and also there is the risk of the operator being in danger from thieves who wish to steal the cash from the till or cash register. The latter danger arises especially where the retail outlet having the till or cash register is open late in the evening or indeed is open for 24 hours.

SUMMARY OF THE INVENTION

There is a need therefore to provide a cash handling apparatus designed to operate to mitigate these risks and disadvantages. Accordingly, this invention provides a cash handling apparatus comprising a container for holding the cash inserted into the apparatus so that it is not readily accessible either to the apparatus operator or a thief, insertion means for the insertion of cash into the apparatus, detection means for detecting the amount of cash inserted, price infeed means for inserting the price of an article or articles purchased by a customer, and change dispensing means for dispensing the difference in the price fed into the apparatus and the amount of cash inserted as detected by the detection means; the arrangement being that the insertion means and container are arranged so that once the cash has been inserted into the container it is not thereafter readily accessible to the operator, customer or thief.

Not readily accessible may mean that the cash container is in the nature of a strong box which can only be opened by say another person (manager or owner) who has the means to open the box.

By this arrangement the apparatus can be operated essentially without access to the cash stored therein, which makes it very difficult for thieves to steal money from the apparatus and indeed makes it difficult also for the operator to pilfer cash. The invention therefore has particular applicability for high risk retail outlets such as those open late or open 24 hours and also those retail outlets which are located in particularly dangerous neighborhoods.

The control technology for such an apparatus can readily be formulated having regard to the control technology which is currently available. Indeed, vending machines use control technology which can be adapted for this particular invention.

In the general use of the invention, the till operator, upon being approached by a customer to make a purchase or purchases, would enter the price of the purchase or the total price of the purchases; he or the customer would then feed cash into the apparatus through the cash insertion means, and the apparatus would automatically dispense the customer's change, or indeed it may be arranged to indicate when the amount of cash fed in is not sufficient to cover the cost of the purchase or purchases.

The insertion means and the change dispenser preferably are arranged to accept coins and notes and to dispense coins and notes.

The till, as provided in many tills today, may also be provided with program coding for the articles to be sold so that instead of entering the actual price the operator enters a code for the article so that the price is automatically produced. This will assist in mitigating fraudulent dealings by the operator.

The basic operation of the machine is that the cash is safely locked inside the machine and there is no simple way for the operator or thief to gain access to the cash.

The apparatus may be adapted so that the price insertion means is in the form of a bar code reader so that as each article is presented for purchase, it has a bar code which is read by the reader and the price is automatically produced. Such scanning and bar code arrangements are already in use in supermarkets.

With such an arrangement sales and prices could be accurately monitored which mitigates against pilfering. An "Epos" system could be used for effecting such control by providing a central electronic tracking and control system capable of monitoring and checking prices, inventory, available money for change and refunds, and transactions relating to single or multiple remote locations, and further being capable of electronically issuing alarm and control signals to the remote locations.

In circumstances where articles are returned for refund; a special secret code number may be provided on a key pad which may or may not form part of the price infeed means. This would preferably be such as to prevent the operator from gaining access to the supply of cash from which the refund is dispensed, the cash dispensed being delivered directly to the person to whom the refund is awarded. Means may be provided for displaying or identifying the amount of each refund.

As an additional security measure in relation to the giving of refund as indicated above, the apparatus could be provided with an alarm arranged to operate should an excessive level of refund occur. This may occur for example in a situation in which the operator was being coerced into giving repeated refunds.

By using an Epos system it might also be possible automatically to block any refund which did not correspond with the a specific sale made within a specific period.

DESCRIPTION OF THE PREFERRED EMBODIMENTS

Figure 1:
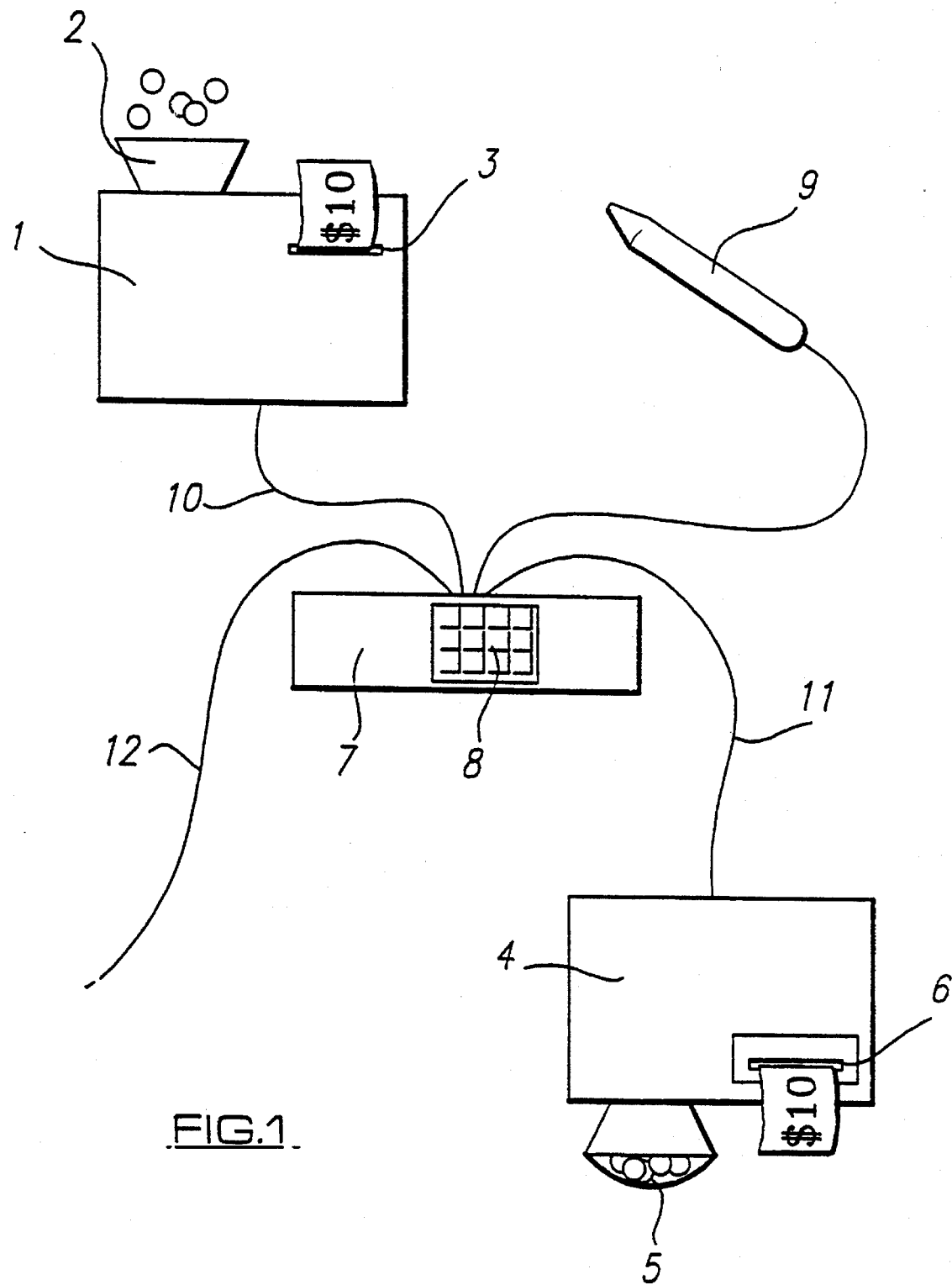
FIG. 1 is a schematic representation of the preferred embodiment of the present invention.

Unit 1 is the container which will be of strong box character so that access is difficult, and it will be fixed securely at the retail outlet location so that a thief cannot simply carry away the entire unit.

Unit 1 has coin and note insertion apertures 2 and 3 for the insertion of the customer's cash.

Unit 4 is the coin and note dispensing mechanism having a coin dispensing tray 5 and a note dispensing slot 6.

Unit 7 is the control unit and provides a price insertion pad 8, which may be a bar code reader, keyboard or alternative arrangement. The bar code reader is indicated by reference 9.

The units are linked by connections 10 and 11, and an additional central and remote connection 12 provides a link to a central monitoring, alarm and checking system. The remote control system may also keep a watch on the amount of cash and notes available in the dispenser to ensure that there will be sufficient change in the unit 4 to enable the apparatus to continue functioning.

The central control unit may be arranged to send signals to the local apparatus at the retail outlet to indicate to the operator the general condition of the apparatus and an indication of whether or not it can continue to perform its function. The type of monitoring which would be beneficial would be monitoring of the type of articles sold, and monitoring the number sold in a particular period, to give an indication of the need to re-order or to indicate whether or not to discontinue selling particular articles, as found in systems presently in use. The central control unit has additional controls which indicate whether or not the change giving section of the apparatus is still able to provide change for customers, and locally at the retail outlet there should be displays of the price of articles and the amount of change to be given.

The effectiveness and desirability of the apparatus will be clearly understood from the above and it will also be understood that it can take many and different embodiments.

The apparatus is a cash register which stores and dispenses cash as distinguished from product or ticket dispensing machines which operate automatically for the dispensing of tickets and products and usually are operational on an unmanned basis in public places.

I claim:

1. Cash handling apparatus comprising: insertion means for the insertion of cash into the apparatus by a customer for an article or articles; a container for holding the cash inserted into the apparatus; detection means for detecting the amount of cash inserted price; infeed means to notify to the apparatus a price of the article or articles; calculation means for comparing the difference between the cash fed into the apparatus and the price of the article or articles; and dispensing means for dispensing cash equal to the difference in the price to be paid and the amount of cash inserted as detected by the detection means; wherein the insertion means and container are arranged so that once the cash has been inserted into the container it is not thereafter readily accessible and the cash insertion means and cash dispensing means and price infeed means are provided such that the customer inserts the cash as payment and dispensed cash representing the change due is delivered directly to the customer; and wherein an electrical datalink connects the apparatus to a central monitoring, alarm and checking system.

2. Apparatus according to claim 1 arranged to indicate when the amount of cash fed in is not sufficient to cover the price of the article or articles to be purchased.

3. Apparatus according to claim 1 wherein the price infeed means is in the form of a bar code reader such that the bar code provided on the article to be purchased is read and the price is automatically fed into the apparatus.

4. Apparatus according to claim 1 wherein the apparatus can be operated by the input of an access code number.

5. Apparatus according to claim 1 wherein the apparatus includes means for displaying or identifying the amount of cash to be dispensed and/or a refund.

6. Apparatus according to claim 1 wherein the apparatus includes means to automatically block any cash dispense refund which does not correspond with a specific sale of a specific article made within a specific period.

7. Apparatus according to claim 1 wherein the central system monitors the amount of cash and notes available in the cash dispensing means to ensure that there is sufficient change in the apparatus to enable the apparatus to continue functioning.

8. Apparatus according to claim 1 wherein the central system is arranged to send signals to the apparatus to indicate to the operator the general condition of the apparatus.

9. Apparatus according to claim 1 wherein the cash insertion means, the cash dispensing means, and price infeed means are operable by the customer.

10. Apparatus according to claim 1 wherein the cash insertion means and the cash dispensing memos are arranged to accept coins and notes and to dispense coins and notes, respectively.

11. Apparatus according to any of claims 1, 9 or 10 wherein the price infeed means comprises program coding means for the articles to be sold such that the code for the article is input to infeed the price into the apparatus.

* * * * *